United States Patent
Choi et al.

(10) Patent No.: US 9,866,130 B1
(45) Date of Patent: Jan. 9, 2018

(54) DC-DC CONVERTER AND CONTROL METHOD THEREOF

(71) Applicants: Hyundai Motor Company, Seoul (KR); Kia Motors Corporation, Seoul (KR); Korea Advanced Institute of Science and Technology, Daejeon (KR)

(72) Inventors: Jaehyuk Choi, Seoul (KR); Woo Young Lee, Gyeonggi-do (KR); Seok Joon Kim, Gyeonggi-do (KR); Jong Pil Kim, Gyeonggi, do (KR); Sam Gyun Kim, Gyeonggi-do (KR); Gun Woo Moon, Daejeon (KR); Han Shin Youn, Daejeon (KR); Jae Bum Lee, Daejeon (KR); Jae Il Baek, Daejeon (KR)

(73) Assignees: Hyundai Motor Company, Seoul (KR); Kia Motors Corporation, Seoul (KR); Korea Advanced Institute of Science and Technology, Daejeon (KR)

(*) Notice: Subject to any disclaimer, the term of this patent is extended or adjusted under 35 U.S.C. 154(b) by 0 days.

(21) Appl. No.: 15/363,061

(22) Filed: Nov. 29, 2016

(30) Foreign Application Priority Data

Sep. 8, 2016 (KR) .......................... 10-2016-0115744

(51) Int. Cl.
*H02M 3/335* (2006.01)
*H02M 7/48* (2007.01)

(52) U.S. Cl.
CPC ... *H02M 3/33569* (2013.01); *H02M 3/33507* (2013.01); *H02M 2007/4815* (2013.01)

(58) Field of Classification Search
CPC ........... H02M 3/3353; H02M 3/33569; H02M 7/521; H02M 7/5387; H02M 7/53871;
(Continued)

(56) References Cited

U.S. PATENT DOCUMENTS

| 5,132,888 A | * | 7/1992 | Lo | ......................... H02M 3/337 363/132 |
| 5,875,103 A | * | 2/1999 | Bhagwat | ............. H02M 3/3376 363/17 |

(Continued)

FOREIGN PATENT DOCUMENTS

KR  10-2015-0081396 A   7/2015

OTHER PUBLICATIONS

Yoon, Hyun-Ki et al, "Zero-Current Switching Two-Transformer Phase-Shifted Full-Bridge Converter using Voltage Ripple", The Transactions of the Korean Institute of Power Electronics, vol. 11, Issue 1 (Feb. 2006) pp. 14-21 English Abstract.

(Continued)

*Primary Examiner* — Nguyen Tran
(74) *Attorney, Agent, or Firm* — Mintz Levin Cohn Ferris Glovsky and Popeo, P.C.; Peter F. Corless (57) ABSTRACT

A DC-DC converter includes: a clamp capacitor having one terminal connected with a ground terminal of a voltage source; a switching circuit including first and second switches connected with each other in series between a positive terminal and the ground terminal of the voltage source, and third and fourth switches connected with each other in series between both terminals of the clamp capacitor; and a forward-flyback transformer including a plurality of primary coils connected between a first connection node between the first and second switches and a second connection node between the third and fourth switches.

7 Claims, 8 Drawing Sheets

(58) Field of Classification Search
CPC ............. H02M 2007/4815; H02M 2007/4818; H02M 1/083; H02M 3/33507; Y02B 70/1491
USPC ...................... 363/17, 98, 132, 21.01–21.398
See application file for complete search history.

(56) References Cited

U.S. PATENT DOCUMENTS

| | | | | |
|---|---|---|---|---|
| 5,946,200 | A * | 8/1999 | Kim ........................ | H02M 1/34 363/132 |
| 2006/0039170 | A1* | 2/2006 | Friedrich .............. | H02M 3/337 363/17 |

OTHER PUBLICATIONS

Kim, Jong-Woo et al, "A Simple Switching Control Technique for Improving Light Load Efficiency in a Phase-Shifted Fun-Bridge Converter with a Server Power System", IEEE Transactions on Power Electronics, vol. 29, Issue 4 (Apr. 2014), pp. 1562-1566, English Abstract.

* cited by examiner

DC-DC CONVERTER AND CONTROL METHOD THEREOF

CROSS-REFERENCE TO RELATED APPLICATION

This application claims under 35 U.S.C. §119(a) the benefit of Korean Patent Application No. 10-2016-0115744 filed in the Korean Intellectual Property Office on Sep. 8, 2016, the entire contents of which are incorporated herein by reference.

BACKGROUND (a) Technical Field

The present disclosure relates to a DC-DC converter.

(b) Description of the Related Art

In recent years, as environmental regulations such as $CO_2$ regulation are tightened, there has been a growing interest in environmentally-friendly vehicles. To cope with this, car makers have actively conducted research and product development for a pure electric vehicle or a hydrogen vehicle as well as a hybrid vehicle or a plug-in hybrid vehicle.

The environmentally-friendly vehicles have used a high voltage battery for storing electrical energy obtained from various energy sources. Further, to power electric apparatuses of a vehicle such as an electric power steering (EPS), audio, and an anti-lock brake system (ABS), a low voltage DC-DC converter (LDC) that additionally generates low pressure power to supply energy stored in a high voltage battery has been used.

Generally, the LDC is mounted in an engine room in a vehicle, and therefore needs to be high density and high efficiency. In particular, the LDC is mostly operated in a light load area, and therefore the LDC needs to have higher efficiency in the light load area.

The above information disclosed in this Background section is only for enhancement of understanding of the background of the disclosure and therefore it may contain information that does not form the prior art that is already known in this country to a person of ordinary skill in the art.

SUMMARY

The present disclosure provides a DC-DC converter and a control method thereof having advantages of improving efficiency in a light load area.

An exemplary embodiment of the present disclosure provides a DC-DC converter including: a clamp capacitor having one terminal connected with a ground terminal of a voltage source, a switching circuit including first and second switches connected with each other in series between a positive terminal and the ground terminal of the voltage source and third and fourth switches connected with each other in series between both terminals of the clamp capacitor, and a forward-flyback transformer including a plurality of primary coils connected between a first connection node between the first and second switches and a second connection node between the third and fourth switches.

Another embodiment of the present disclosure provides a control method of a DC-DC converter including a clamp capacitor having one terminal connected with a ground terminal of a voltage source, a switching circuit including first and second switches connected with each other in series between a positive terminal and the ground terminal of the voltage source and third and fourth switches connected with each other in series between both terminals of the clamp capacitor, and a forward-flyback transformer including a plurality of primary coils connected between a first connection node between the first and second switches and a second connection node between the third and fourth switches, the method including: turning on, by a controller, the first switch and the fourth switch; turning off, by the controller, the first switch and the fourth switch if the first switch and the fourth switch are turned on and a predetermined time lapses; turning on, by the controller, the second switch and the third switch; turning off, by the controller, the second switch if the second switch and the third switch are turned on and the predetermined time lapses; and turning off, by the controller, the third switch if the second switch is turned off and the predetermined time lapses.

According to an exemplary embodiment of the present disclosure, it is possible to improve efficiency in the light load area of the low voltage DC-DC converter.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings so that those skilled in the art to which the present disclosure pertains may easily practice the present disclosure. However, the present disclosure may be implemented in various different forms and is not limited to exemplary embodiments provided herein.

Throughout this specification and the claims that follow, when it is described that an element is "coupled" to another element, the element may be "directly coupled" to the other element or "electrically coupled" to the other element through a third element.

Hereinafter, a DC-DC converter according to an exemplary embodiment of the present disclosure will be described with reference to the accompanying drawings.

Figure 1:
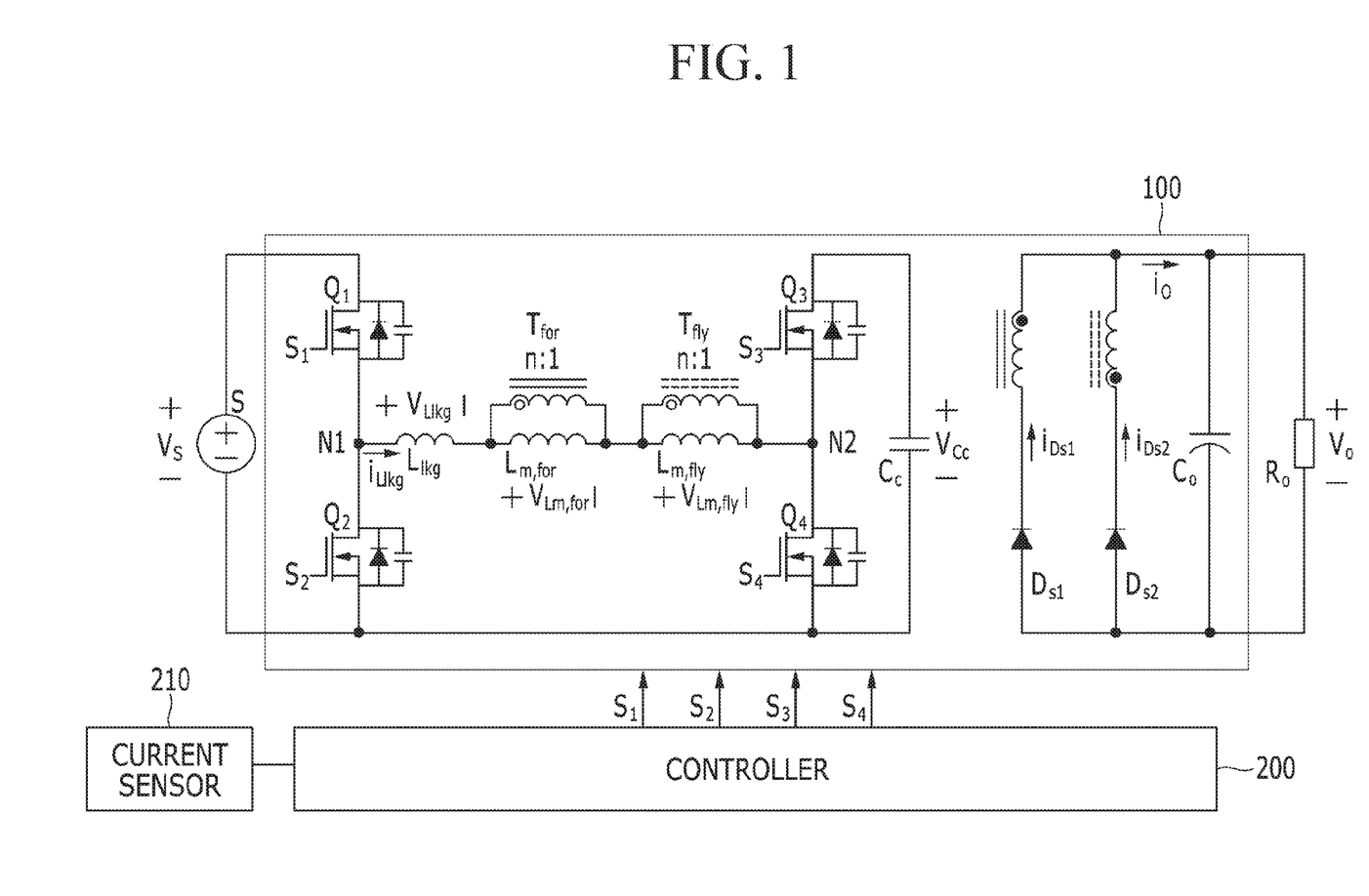
FIG. 1 is a diagram schematically illustrating a DC-DC converter according to an exemplary embodiment of the present disclosure.

FIG. 1 is a diagram schematically illustrating a DC-DC converter according to an exemplary embodiment of the present disclosure.

Referring to FIG. 1, a DC-DC converter according to an exemplary embodiment may include a low voltage DC-DC converter 100 and a controller 200.

The low voltage DC-DC converter 100 serves to buck a high voltage applied from a voltage source S (e.g., a high voltage battery) to a low voltage and transfers the low voltage to a load Ro.

The low voltage DC converter 100 may include a switching circuit including a plurality of switches $Q_1$, $Q_2$, $Q_3$, and $Q_4$, a forward-flyback transformer, a clamp capacitor Cc, a plurality of rectifying diodes $D_{S1}$ and $D_{S2}$, and an output capacitor Co.

The switching circuit serves to convert a DC voltage Vs input from the voltage source S by switching into an AC voltage and output the AC voltage as an input voltage $V_{Lm,fly}+V_{Lm,for}$ of the forward-flyback transformer.

The switching circuit includes first and second switches $Q_1$ and $Q_2$ connected with each other in series between a positive terminal and a ground terminal (or negative terminal), and third and fourth switches $Q_3$ and $Q_4$ connected with each other in series between both terminals of the clamp capacitor Cc. The first switch $Q_1$ is connected between the positive terminal of the voltage source S and a first connection node N1 and the second switch $Q_2$ is connected with a first connection node N1 and the ground terminal of the voltage source S. Further, the third switch $Q_3$ is connected between one terminal of the clamp capacitor Cc and the second connection node N2 and the fourth switch $Q_4$ is connected between the second connection node N2 and the other terminal of the clamp capacitor Cc.

The switches $Q_1$, $Q_2$, $Q_3$, and $Q_4$ included in the switching circuit may include an output capacitor (or parasitic capacitor) and a parasitic diode (or body diode).

The switches $Q_1$, $Q_2$, $Q_3$, and $Q_4$ included in the switching circuit may be controlled to be turned on/off depending on switching control signals $S_1$, $S_2$, $S_3$, and $S_4$ of the controller 200.

The terminal connected with the fourth switch $Q_4$ of both terminals of the clamp capacitor Cc is connected with the ground terminal of the voltage source S. Therefore, the fourth switch $Q_4$ is connected between the second connection node N2 and the ground terminal.

The forward-flyback transformer bucks the input voltage $V_{Lm,fly}+V_{Lm,for}$ transferred to a primary side thereof by a switching circuit and then transfers the bucked $V_{Lm,fly}+V_{Lm,for}$ voltage to a secondary side thereof.

The forward-flyback transformer includes a forward transformer $T_{for}$ and a flyback transformer $T_{fly}$. The forward-flyback transformer may further include a leak inductance $L_{lkg}$ that is parasitic in the forward-flyback transformer.

The forward-flyback transformer replaces a magnetizing inductance of the flyback transformer $T_{fly}$ by a function of an output inductance, and therefore the output inductance may be omitted.

The forward transformer $T_{for}$ and the flyback transformer $T_{fly}$ include primary coils connected with each other between the first connection node N1 and the second connection node N2. Further, the forward transformer $T_{for}$ and the flyback transformer $T_{fly}$ include secondary coils applied with energy from a primary coil. Secondary coils of the forward transformer $T_{for}$ and the flyback transformer $T_{fly}$ are connected with each other in parallel between both terminals of the load Ro. One terminal of both of a secondary coil of the forward transformer $T_{for}$ and a secondary coil of the flyback transformer $T_{fly}$ is connected with a positive terminal of the load Ro. Further, the other terminal of the secondary coil of the forward transformer $T_{for}$ and the other terminal of the secondary coil of the flyback transformer $T_{fly}$ are each connected with the ground terminal (or negative terminal) of the load Ro through different rectifying diodes $D_{S1}$ and $D_{S2}$.

The plurality of rectifying diodes $D_{S1}$ and $D_{S2}$ are each connected with the secondary coils of the forward transformer $T_{for}$ and the flyback transformer $T_{fly}$ and the ground terminal of the load Ro and serves to rectify a voltage output to the secondary side of the transformer.

A cathode of the first rectifying diode $D_{S1}$ and a cathode of the second rectifying diode $D_{S2}$ are each connected with the secondary coil of the forward transformer $T_{for}$ and the secondary coil of the flyback transformer $T_{fly}$, respectively. Further, anodes of the first and second rectifying diodes $D_{S1}$ and $D_{S2}$ are connected with the ground terminal of the load Ro.

The output capacitor Co is connected with between the positive terminal of the load Ro and the ground terminal and an output voltage Vo output to the load Ro performs a smoothing function. That is, an output capacitor Co serves to remove a ripple of voltage that is rectified by the rectifying diodes $D_{S1}$ and $D_{S2}$ and output to the load Ro and constantly maintain the voltage.

The controller 200 controls switching of each switch $Q_1$, $Q_2$, $Q_3$, and $Q_4$ that configures a switching circuit.

The controller 200 uses switching control signals $S_1$ and $S_4$ having a duty ration D to drive the first and fourth switches $Q_1$ and $Q_2$, uses a switching control signal S3 having a duty ratio 1-D to drive the third switch $Q_3$, and controls an operation of the second switch $Q_2$ so that the second switch $Q_2$ is turned on in a portion of an interval in which the third switch $Q_3$ is turned on.

Hereinafter, referring to FIGS. 2 to 8, a method for controlling, by a controller 200, switching of each switch $Q_1$, $Q_2$, $Q_3$, and $Q_4$ configuring a switching circuit will be described in detail.

Figure 2:
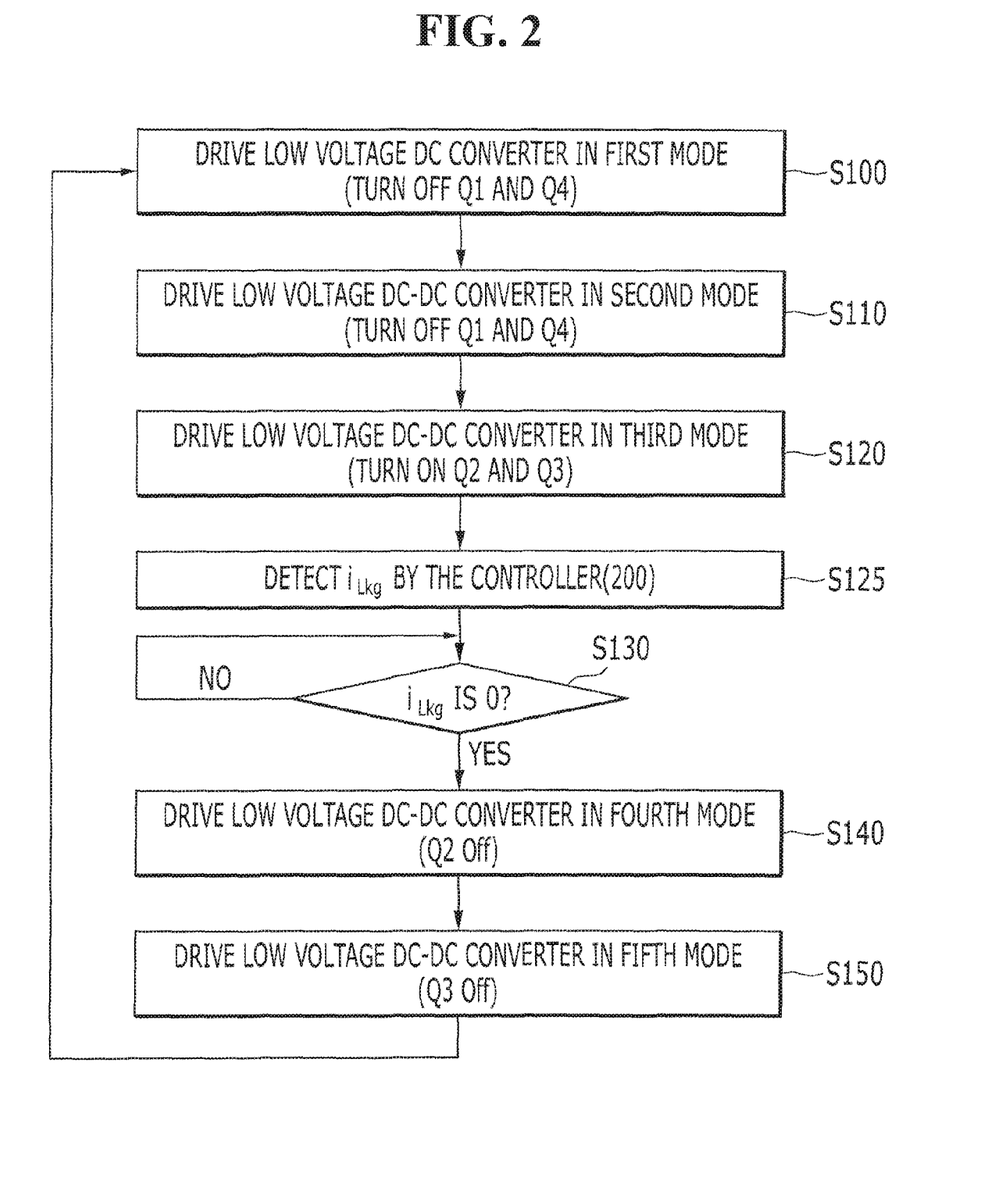
FIG. 2 is a block diagram illustrating a control method of a DC-DC converter according to an exemplary embodiment of the present disclosure.
Figure 3:
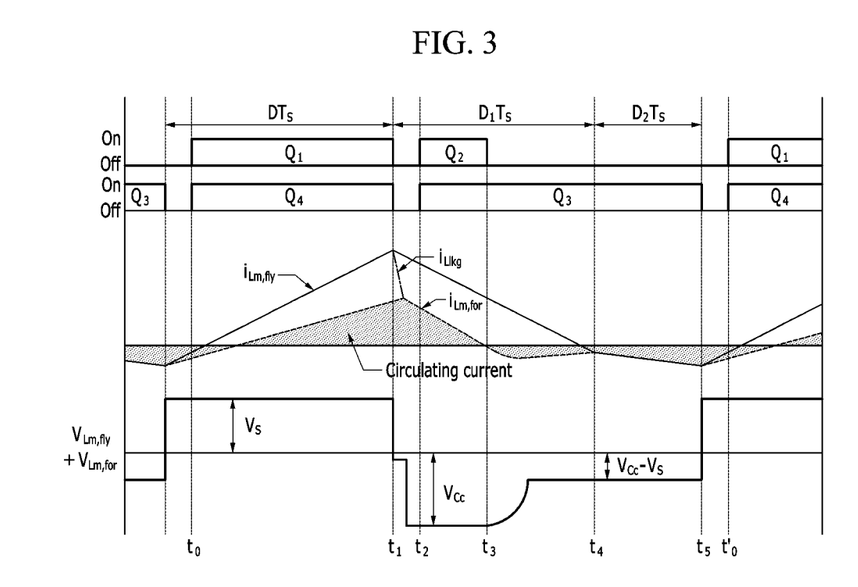
FIG. 3 is a schematic switch driving timing chart of the DC-DC converter according to the exemplary embodiment of the present disclosure.

FIG. 2 is a block diagram illustrating a control method of a DC-DC converter according to an exemplary embodiment of the present disclosure. Further, FIG. 3 is a schematic switch driving timing chart of the DC-DC converter according to the exemplary embodiment of the present disclosure. Further, FIGS. 4 to 8 are diagrams illustrating a current flow of a low voltage DC-DC converter depending on each driving mode according to an exemplary embodiment of the present disclosure.

The control method of FIG. 2 may be performed by the controller 200 of the DC-DC converter according to the exemplary embodiment of the present disclosure.

Referring to FIG. 2, the controller 200 turns on the first and fourth switches $Q_1$ and $Q_4$ for the duty ratio D to drive the low voltage DC-DC converter 100 in a first mode (corresponding to an interval of $t_0$ to $t_1$ of FIG. 3) (S100).

Figure 4:
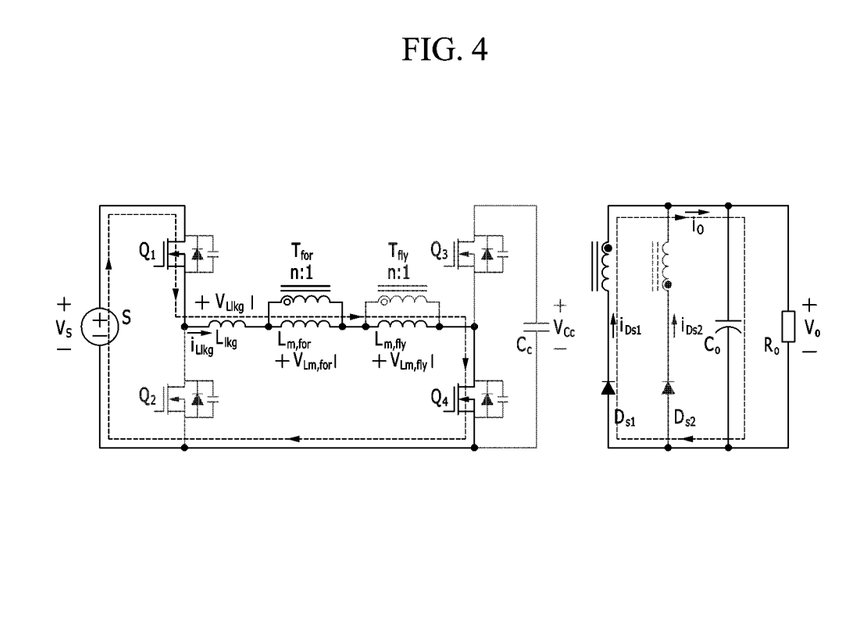
FIGS. 4 to 8 are diagrams illustrating a current flow of a low voltage DC-DC converter depending on each driving mode according to an exemplary embodiment of the present disclosure.

FIG. 4 is a schematic diagram of a current flow of the low voltage DC-DC converter 100 in a first mode.

Referring to FIG. 4, the first switch $Q_1$ and the fourth switch $Q_4$ in the first mode (corresponding to an interval of $t_0$ to $t_1$ of FIG. 3) maintain the turn-on state and the second switch $Q_2$ and the third switch $Q_3$ maintain the turn-off state.

If the first switch $Q_1$ and the fourth switch $Q_4$ are turned on, an input voltage Vs applied from the voltage source S is applied as the primary side input voltage $V_{Lm,fly}+V_{Lm,for}$ of the forward-flyback transformer. Therefore, a voltage having the same polarity as a primary coil is induced to the secondary coil of the forward transformer $T_{for}$ and therefore the first rectifying diode $D_{S1}$ is conducted in a forward bias. Therefore, energy is transferred to the load Ro through the forward transformer $T_{for}$.

Further, a voltage having opposite polarity to the primary coil of the flyback transformer $T_{fly}$ is induced to the secondary coil of the flyback transformer $T_{fly}$, and therefore the second rectifying diode $D_{S2}$ is biased reversely and thus is blocked. Therefore, a current flows only into a primary winding of the flyback transformer $T_{fly}$, and thus energy is stored by the magnetizing inductance $L_{m,fly}$ of the flyback transformer $T_{fly}$.

Referring back to FIG. 2, the controller 200 drives the low voltage DC-DC converter 100 in the first mode and then turns off the first and fourth switches $Q_1$ and $Q_4$ to drive the low voltage DC-DC converter 100 in a second mode (corresponding to an interval of $t_1$ to $t_2$ of FIG. 3) (S110).

Figure 5:
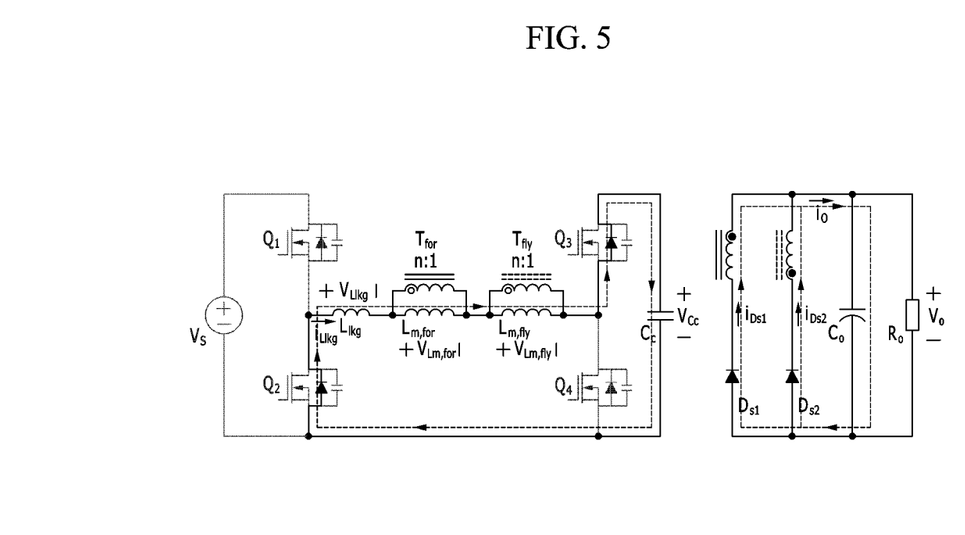

FIG. 5 is a schematic diagram of a current flow of the low voltage DC-DC converter 100 in the second mode.

Referring to FIG. 5, the first switch Q1 and the fourth switch Q4 are turned off in the second mode (corresponding to an interval of $t_1$ to $t_2$ of FIG. 3). If the first switch $Q_1$ and the fourth switch $Q_4$ are turned off, a current flows along the parasitic diodes of the third switch $Q_3$ and the second switch $Q_2$ by the energy accumulated in the magnetizing inductance $L_{m,fly}$ of the flyback transformer $T_{fly}$ to charge the clamp capacitor Cc. Further, a voltage having opposite polarity to the previous state is induced to the secondary coil of the flyback transformer $T_{fly}$ due to a generation of a counter electromotive force, and thus the second rectifying diode $D_{S2}$ is conducted in a forward bias.

The parasitic capacitors of the second and third switches $Q_2$ and $Q_3$ are continuously discharged in the second mode, and therefore the second and third switches $Q_2$ and $Q_3$ satisfy a zero-voltage-switching (ZVS) condition.

Referring back to FIG. 2, the controller 200 drives the low voltage DC-DC converter 100 in the second mode and then turns on the second and third switches $Q_2$ and $Q_3$ to drive the low voltage DC-DC converter 100 in a third mode (corresponding to an interval of $t_2$ to $t_3$ of FIG. 3) (S120).

Figure 6:
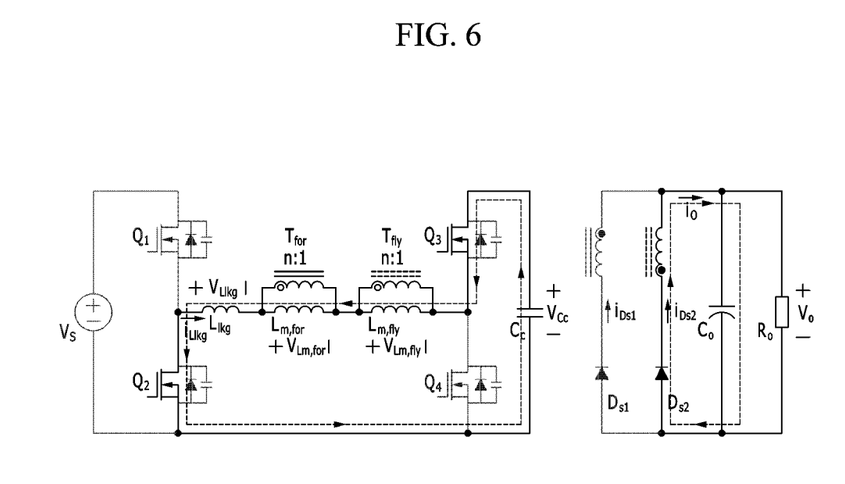

FIG. 6 is a schematic diagram of a current flow of the low voltage DC-DC converter 100 in the third mode.

Referring to FIG. 6, the second switch $Q_2$ and the third switch $Q_3$ in the third mode (corresponding to an interval of $t_2$ to $t_3$ of FIG. 3) maintain the turn-on state and the first switch $Q_1$ and the fourth switch $Q_4$ maintain the turn-off state.

If the second switch $Q_2$ and the third switch $Q_3$ are turned on, a voltage $-V_{Cc}$ applied from the clamp capacitor Cc is applied as the primary side input voltage $V_{Lm,fly}+V_{Lm,for}$ of the forward-flyback transformer. Therefore, a voltage having opposite polarity to a primary coil is induced to the secondary coil of the flyback transformer $T_{fly}$, and therefore the second rectifying diode $D_{S2}$ is conducted in a forward bias. Therefore, energy is transferred to the load Ro through the forward transformer $T_{fly}$.

Further, a voltage having the same polarity as the primary coil of the forward transformer $T_{for}$ is induced to the secondary coil of the forward transformer $T_{for}$, and therefore the first rectifying diode $D_{S1}$ is biased reversely and thus is blocked. Further, the forward transformer $T_{for}$ is reset by the voltage $-V_{Cc}$ applied from the clamp capacitor Cc.

Referring back to FIG. 2, the controller 200 continuously detects a current flowing into the leak inductance $L_{lkg}$ of the transformer through a current sensor (not illustrated) while the low voltage DC-DC converter 100 is driven in the third mode. Further, if the current flowing into the leak inductance of the transformer becomes 0A (S130), the second switch Q2 is turned off to drive the low voltage DC-DC converter in a fourth mode (corresponding to an interval of $t_3$ to $t_5$ of FIG. 3) (S140). For this purpose, the DC-DC converter may further include the current sensor to detect a current flowing into the leak inductance $L_{lkg}$.

Figure 7:
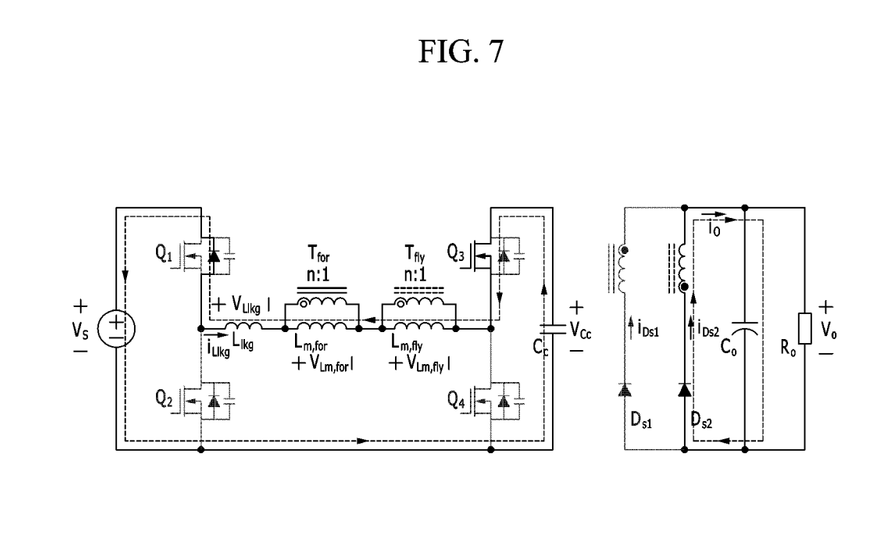

FIG. 7 is a schematic diagram of a current flow of the low voltage DC-DC converter 100 in the fourth mode.

Referring to FIG. 7, the second switch Q2 maintains the turn-off state and the third switch Q3 maintains the turn-on state, in the fourth mode (corresponding to an interval of $t_3$ to $t_5$ of FIG. 3). Further, the first switch $Q_1$ and the fourth switch $Q_4$ maintain the turn-off state.

If the second switch $Q_2$ is turned off, a circulating current flows through the parasitic diode of the first switch Q1 and thus a difference voltage $Vs-V_{Cc}$ between the output voltage of the voltage source S and the voltage of the clamp capacitor Cc is applied as the primary side input voltage $V_{Lm,fly}+V_{Lm,for}$ of the forward-flyback transformer. Therefore, a voltage having opposite polarity to a primary coil is induced to the secondary coil of the flyback transformer $T_{fly}$ and therefore the second rectifying diode $D_{S2}$ is conducted in a forward bias. Therefore, energy is transferred to the load Ro through the forward transformer $T_{fly}$.

Further, a voltage having the same polarity as the primary coil of the forward transformer $T_{for}$ is induced to the secondary coil of the forward transformer $T_{for}$, and therefore the first rectifying diode $D_{S1}$ is biased reversely and thus is blocked.

Referring back to FIG. 2, the controller 200 drives the low voltage DC-DC converter 100 in the fourth mode and then turns off the third $Q_3$ to drive the low voltage DC-DC converter 100 in a fifth mode (corresponding to an interval of $t_5$ to $t'_0$ of FIG. 3) (S150).

Figure 8:
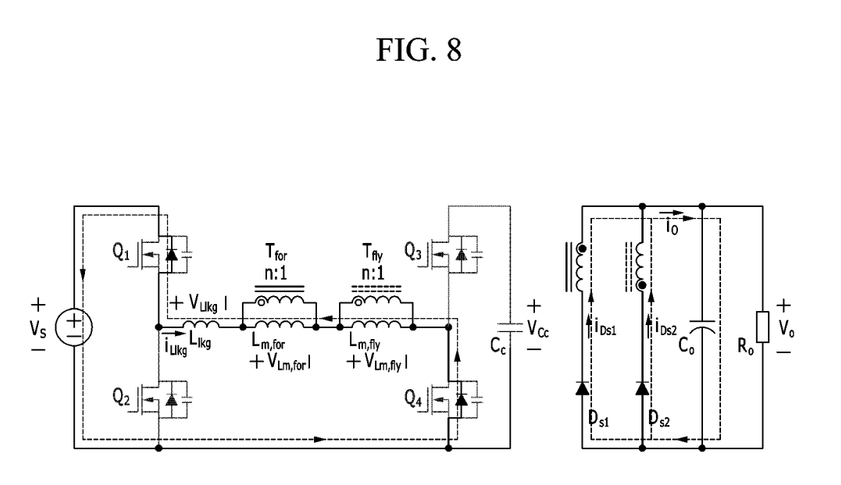

FIG. 8 is a schematic diagram of the current flow of the low voltage DC-DC converter 100 in the fifth mode.

Referring to FIG. 8, the third switch Q3 is turned off in the fifth mode (corresponding to an interval of $t_5$ to $t'_0$ of FIG. 3). If the third switch $Q_3$ is turned off, a current flows along the parasitic diodes of the first switch $Q_1$ and the fourth switch $Q_4$ for a predetermined time by the energy accumulated in the magnetizing inductance $L_{m,for}$ of the forward transformer $T_{for}$. Further, a voltage having opposite polarity to the previous state is induced to the secondary coil of the forward transformer $T_{for}$ due to the generation of the counter electromotive force, and thus the first rectifying diode $D_{S1}$ is conducted in a forward bias.

The parasitic capacitors of the first and fourth switches $Q_1$ and $Q_4$ are continuously discharged in the fifth mode, and therefore the first and fourth switches $Q_1$ and $Q_4$ satisfy the zero-voltage-switching (ZVS) condition.

The controller 200 repeatedly performs the steps S100 to S150, and thus the low voltage DC-DC converter 100 performs a control to buck the voltage input from the voltage source S that is the high voltage battery and output the bucked voltage to the load Ro.

The low voltage DC-DC converter 100 according to the exemplary embodiment of the present disclosure is operated as a full-bridge active-clamp forward-flyback transformer. The low voltage DC-DC converter 100 limits an output current using the magnetizing inductance of the flyback transformer.

Meanwhile, when considering the saturation of each transformer in the low voltage DC-DC converter 100, the transformer is designed to have the small magnetizing inductance, and thus has a large circulating current circulating the primary side of the transformer other than the output current output to the load, thereby showing a high light load conduction loss. Further, if a complementary switching driving scheme that alternately turns on the first and fourth switches Q1 and Q4 and the second and third switches Q2 and Q3 is used at the time of driving the low voltage DC-DC converter 100, the transformer shows a huge change in magnetic flux, such that a loss of the transformer occurs. The loss of the transformer and the conduction loss due to the circulating current may act as a factor of reducing the efficiency at the time of the light load.

Accordingly, according to the exemplary embodiment of the present disclosure, as illustrated in FIGS. 2 and 3, the second switch $Q_2$ is turned on only for a portion of the interval in which the third switch $Q_3$ is turned on to reduce the circulating current, thereby reducing the conduction loss occurring due to the circulating current.

If the relationship between the input voltage and the output voltage depending on the complementary switching driving scheme may be represented by the following Equation 1, the relationship between the input voltage and the output voltage depending on the switching driving scheme illustrated in FIG. 3 may be represented by the following Equation 2.

$$V_o/V_s = D/n \quad \text{[Equation 1]}$$

$$V_o/V_s = (D/D+D_1)/n \quad \text{[Equation 2]}$$

Referring to FIG. 3, in the above Equation 2, $D_1$ corresponds to a current discontinuous conduction mode (DCM) interval.

Comparing the above Equations 1 and 2, the switching driving scheme according to the exemplary embodiment of the present disclosure may control the output voltage with a smaller duty ratio than the complementary switching driving scheme. Accordingly, the switching driving scheme according to the exemplary embodiment of the present disclosure may reduce a magnetic variation in the transformer to reduce the loss of the transformer.

As a result, the control method of a DC-DC converter according to the exemplary embodiment of the present disclosure may reduce the conduction loss and the loss of the transformer when the DC-DC converter is operated at the light load, thereby improving the light load efficiency.

The control method of a DC-DC converter according to the exemplary embodiment of the present disclosure may be executed by software. When the control method is executed by the software, components of the present disclosure are code segments executing required operations. Programs or code segments may be stored in a processor reading function medium or may be transmitted by a computer data signal combined with a carrier in a transmission medium or a communication network.

A computer readable medium includes all kinds of recording apparatuses in which data that may be read by a computer system are stored. An example of the computer readable recording apparatuses may include ROM, RAM, CD-ROM, DVD_ROM, DVD_RAM, a magnetic tape, a floppy disk, a hard disk, an optical data storage device, or the like. In addition, the computer readable recording mediums may be distributed in computer apparatuses connected with each other through a network, and thus computer readable codes may be stored and executed in computer readable recording mediums in a distributed scheme.

The accompanying drawings and the detailed description have not been used in order to limit the meaning or limit the scope of the present disclosure stated in the claims, but have been used only in order to illustrate the present disclosure. Therefore, those skilled in the art may easily perform selection and replacement therefrom. Further, those skilled in the art may omit components without reducing performance of some of the components described in the present specification or add components to improve performance. In addition, those skilled in the art may change an order of steps of a method described in the present specification depending on process environment or equipment. Therefore, the scope of the present disclosure is to be defined by the accompanying claims and their equivalences rather than the embodiments described above.

What is claimed is:

1. A DC-DC converter, comprising:
   a clamp capacitor having one terminal connected with a ground terminal of a voltage source;
   a switching circuit including first and second switches connected with each other in series between a positive terminal and the ground terminal of the voltage source, and third and fourth switches connected with each other in series between both terminals of the clamp capacitor;
   a forward-flyback transformer including a plurality of primary coils connected between a first connection node between the first and second switches and a second connection node between the third and fourth switches; and
   a controller performing a control to alternately turn on the first and fourth switches and the second and third switches and turn on the second switch only in a portion of an interval in which the third switch is turned on,
   wherein the controller turns off the second switch if a detected current flowing into a leak inductance of the forward-flyback transformer is 0 in a state in which the second and third switches are turned on.

2. The DC-DC converter of claim 1, further comprising:
a current sensor detecting the current flowing into the leak inductance.

3. The DC-DC converter of claim 1, wherein:
the forward-flyback transformer includes a forward transformer including a primary coil connected with the first connection node and a flyback transformer including the primary coil connected between the first connection node and the second connection node.

4. The DC-DC converter of claim 3, further comprising:
a first rectifying diode connected between a secondary coil of the forward transformer and a load;
a second rectifying diode connected between a secondary coil of the flyback transformer and the load;
an output capacitor connected between both terminals of the load.

5. The DC-DC converter of claim 4, wherein:
the first rectifying diode includes a cathode connected with the secondary coil of the forward transformer and an anode connected with a ground terminal of the load, and
the second rectifying diode includes a cathode connected with the secondary coil of the flyback transformer and an anode connected with the ground terminal of the load.

6. The DC-DC converter of claim 1, wherein:
the first switch is connected between a positive terminal of the voltage source and the first connection node, the second switch is connected between the first connection node and a ground terminal of the voltage source, the third switch is connected with one terminal of the clamp capacitor and the second connection node, and the fourth switch is connected between the second connection node and the ground terminal of the voltage source.

7. A control method of a DC-DC converter including a clamp capacitor having one terminal connected with a ground terminal of a voltage source, a switching circuit including first and second switches connected with each other in series between a positive terminal and the ground terminal of the voltage source and third and fourth switches connected with each other in series between both terminals of the clamp capacitor, and a forward-flyback transformer including a plurality of primary coils connected between a first connection node between the first and second switches and a second connection node between the third and fourth switches, the method comprising;
turning on, by a controller, the first switch and the fourth switch;
detecting, by controller, a current flowing into a leak inductance of the forward-flyback transformer;
turning off, by the controller, the first switch and the fourth switch if the first switch and the fourth switch are turned on and a predetermined time lapses;
turning on, by the controller, the second switch and the third switch;
turning off, by the controller, the second switch if the second switch and the third switch are turned on and the predetermined time lapses; and
turning off, by the controller, the third switch if the second switch is turned off and the predetermined time lapses,
wherein the turning off of the second switch includes turning off the second switch if the current flowing into the leak inductance is 0.

* * * * *